United States Patent

[11] 3,630,465

[72] Inventor John S. Cucheran
Pleasant Ridge, Mich.
[21] Appl. No. 841,531
[22] Filed July 14, 1969
[45] Patented Dec. 28, 1971
[73] Assignee Jim Robbins Seat Belt Co.
Mt. Clemens, Mich.

[54] ROTARY RETRACTING DEVICE
9 Claims, 4 Drawing Figs.

[52] U.S. Cl. .................................................. 242/107.4
[51] Int. Cl. .................................................. A62b 35/00
[50] Field of Search ............................................. 242/107,
107 SB, 107.4, 107.5, 107.6; 297/388, 386;
280/150 SB

[56] References Cited
UNITED STATES PATENTS
3,294,339  12/1966  Fontaine ...................... 242/107.4
3,363,712  1/1968  Fontaine ...................... 242/107.4 UX
3,412,952  11/1968  Wohlert et al. ................. 242/107.4

*Primary Examiner*—Stanley N. Gilreath
*Assistant Examiner*—Werner H. Schroeder
*Attorneys*—Marvin Bressler and Jonathan Plaut ABSTRACT: A retracting reel assembly including a cylinder with circular ratchet members secured to each end thereof for winding and unwinding a seat belt about the cylinder and a locking pawl movable into locking engagement with the ratchet members to prevent unwinding of the seat belt. The locking pawl is held out of locking engagement with the ratchet members by mechanical engagement with a catch in a leaf spring and the position of the leaf spring is controlled by a bimetallic strip. An electrical circuit is included to control the bimetallic strip so that the locking pawl is held out of locking engagement with the ratchet members for a predetermined time after the seat belt is moved in the unwinding direction whereby the seat belt may be extended and jockeyed back and forth by further extension and retraction until in the proper position before the locking pawl engages the ratchet members to prevent further unwinding of the seat belt.

Patented Dec. 28, 1971
3,630,465
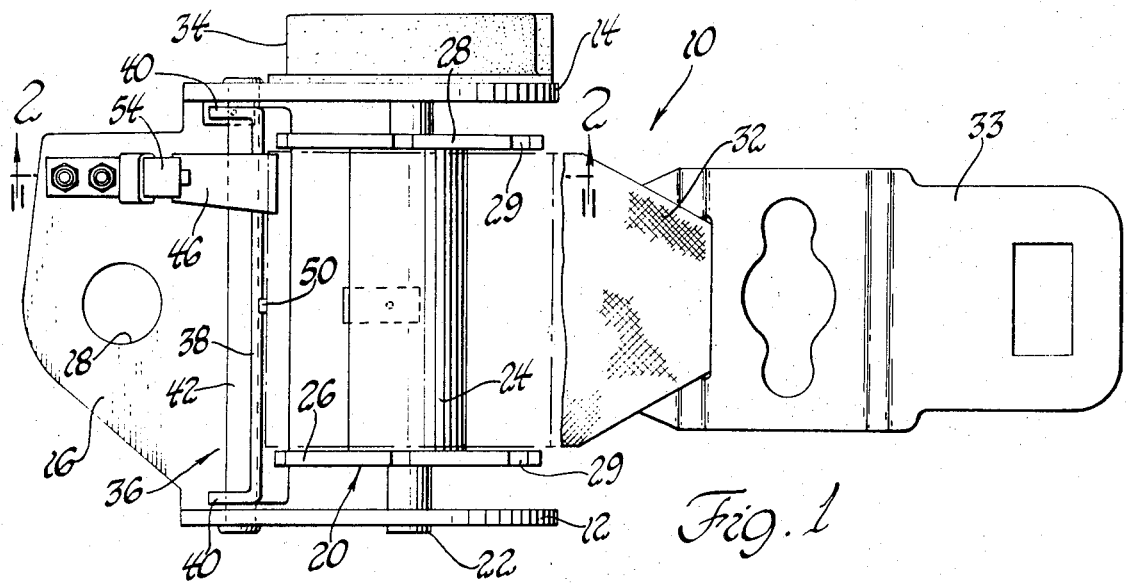
Fig. 1
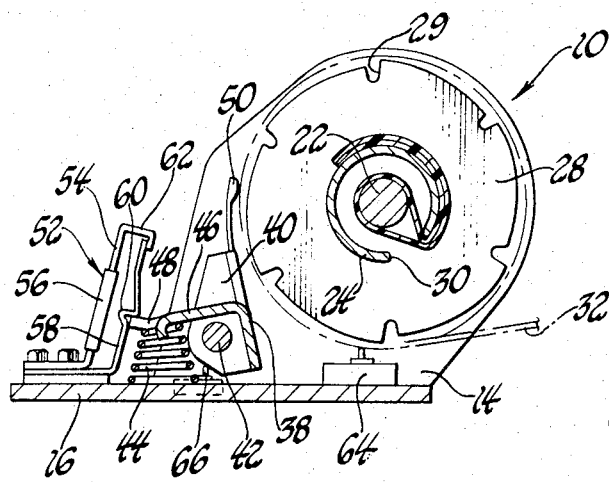
Fig. 2
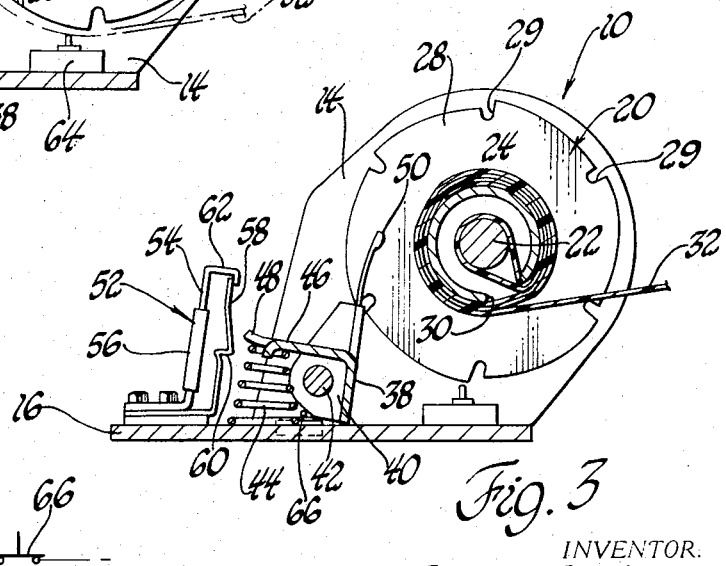
Fig. 3
Fig. 4
INVENTOR.
John S. Cucheran
BY
Barnard, McGlynn & Reising
ATTORNEYS

ROTARY RETRACTING DEVICE

This invention relates to safety seat belt assemblies of the type utilized in automobiles as restraining devices. It is common practice to utilize rollup or retracting assemblies which wind up at least one of the disconnected belt sections so that such sections do not remain loosely disposed on the seat when not in use. A deficiency in such devices is that the passengers rarely realize the amount of belt remaining in the retraction device once the belt is unwound therefrom. The biasing action, which tends to wind the seat belt onto the retraction device, is such that a passenger may buckle a seat belt believing that both sections of the seat belt are fully extended and are, therefore, taut or tight. In actuality, however, and in many cases, the seat belt is not fully extended and in the event of a crash or sudden stop the seat belt will fully extend allowing the passenger to move a dangerous amount.

In order to alleviate this problem, there have been provided retracting assemblies wherein the retracting device is locked to prevent further extension of the seat belt once the seat belt has been partially extended and coupled about the passenger. Normally, a seat belt user will pull the two halves of the seat belt so that at least one-half is unwound from the retracting assembly to the point where the seat belt halves are coupled together at which time there occurs a slight bit of winding or retraction. To prevent further unwinding, retracting assemblies have been developed including a locking member which prevents further extension of the seat belt once the seat belt has been extended and is allowed to retrace a slight amount. The problem with such devices is, however, that the passenger may extend the seat belt an amount which is not sufficient in the first instance and allow it to rewind a certain amount before buckling the seat belt halves together. This, of course, means that the seat belt cannot be extended further without allowing the entire belt to be retracted to the initial position before it may be extended or unwound the desired amount.

Accordingly, it is an object and feature of this invention to provide a retracting reel assembly wherein the seat belt may be extended to an intermediate position and wound and unwound onto the retracting device during the coupling process for a predetermined period before a locking means is activated to prevent further extension or unwinding of the seat belt.

In correlation with the foregoing object and feature, it is another object and feature of this invention to provide such a retracting reel assembly including a locking means movable to a locked position to prevent further extension of the seat belt after the seat belt has been extended a given amount and a bimetallic latch means movable between latched and unlatched positions for retaining the locking means in the unlocked position a predetermined period of time after the seat belt is initially extended from the retracting reel assembly.

Other objects and attendant advantages of the present invention will be readily appreciated as the same becomes better understood by reference to the following detailed description when considered in connection with the accompanying drawings wherein:

FIG. 1 is a plan view of the preferred embodiment of the instant invention;

FIG. 2 is a cross-sectional view taken substantially along line 2—2 of FIG. 1;

FIG. 3 is a cross-sectional view similar to FIG. 2 but showing the assembly in an unwound condition; and FIG. 4 is a schematic view of an electrical circuit means utilized with the instant invention.

Referring now to the drawings wherein like numerals indicate like or corresponding parts throughout the several views, a preferred embodiment of the retracting reel assembly of the instant invention is generally shown at 10.

The reel retracting assembly 10 includes a support means comprising the channel-shaped member defined by a pair of spaced parallel walls or flanges 12 and 14 connected or extending from a base 16. The base 16 has a hole 18 extending therethrough for attaching the assembly to a vehicle.

The assembly also includes a reel means 20 rotatably supported by the walls 12 and 14 of the support means. The reel means 20 includes a shaft 22 rotatably supported by, as being rotatably journaled in, the walls 12 and 14 of the support means. A cylinder 24 is disposed concentrically about the shaft 22. A pair of circular platelike ratchet members 26 and 28 are secured to the ends of the cylinder 24. The ratchet members 26 and 28 are also nonrotatably secured to the shaft 22. Each ratchet member has a plurality of spaced teeth 29 circumferentially spaced thereabout. The cylinder 24 has a slot 30 extending therealong. An elongated flexible element comprising the belt 32 is attached to the shaft 22 and extends through the slot 30 and about the cylinder 24 so as to be wound and unwound therefrom. A tongue 33 is secured to the end of belt 32 and is coupled to a buckle (not shown) after a length of the belt 32 has been unwound and extended from the retracting reel assembly 10. Within the housing 34 there is a first biasing means (not shown) for urging the cylinder 24 and the ratchet members 26 and 28 to rotate in a direction to wind the belt 32 onto the cylinder 24. This first biasing means is a conventional spiral spring with one end fixed with respect to the wall 14 and the other end secured to the end of shaft 22 which extends through the wall 14. The use and disposition of such a spiral spring is well known in the prior art.

The retracting reel assembly 10 also includes locking means generally indicated at 36 and movable between a locked position, as illustrated in FIG. 3, and an unlocked position, as illustrated in FIG. 2, for respectively preventing and allowing rotation of the reel means 20. The locking means 36 includes a locking pawl 38 which is engageable with the ratchet members 26 and 28 when the locked position illustrated in FIG. 3. The pawl is an elongated flat member having inturned flanges 40 through which the pin 42 extends for rotatively supporting the pawl 38. The pin 42 extends through and is supported by the walls 12 and 14 of the support means. There is also included a second biasing means comprising the spring 44 for urging the pawl 38 toward the locking position illustrated in FIG. 3. The pawl has a struck out portion 46 which includes a tab engaging the top of the spring 44 and an extension or projection 48. There is also included a reset means comprising the extension 50 which engages the belt 32 when nearly fully wound about the cylinder 24 for moving the pawl 38 to the unlocked position from the locked position as the belt 32 is wound onto the cylinder 24.

The retracting reel assembly 10 also includes bimetallic latch means generally indicated at 52 and movable between a latched position as illustrated in FIG. 2, and an unlatched position, as illustrated in FIG. 3, so to be in mechanical interlocking engagement with the projection 48 of the locking pawl 38 when in the latched position to prevent movement of the locking pawl 38 to the locked position. The latch means includes a bimetallic strip means comprising the bimetallic strip 54 and heating means 56. The bimetallic strip 54 moves to different positions in response to different temperatures. The latch means also includes a leaf spring member 58 with a catch portion 60 therein. The catch portion 60 is movable with the bimetallic strip and engages the projection 48 when in the latched position illustrated in FIG. 2. The bimetallic strip 54 is disposed adjacent the leaf spring member 58 and has hook 62 which is connected to or in engagement with the leaf spring member 58. The heating means 56 is responsible to electric current for heating the bimetallic strip 54 so that the bimetallic strip 54 will move between the latched and unlatched position illustrated in FIGS. 2 and 3 respectively.

There is also included circuit means shown schematically in FIG. 4 for changing the current flow to the heating means 56 as the belt 32 is unwound from the reel means 20 and again after the locking pawl 38 is in the locked position illustrated in FIG. 3. The circuit means includes a first switch 64 which is actuated by initial unwinding and final winding of the belt 32 and a second switch 66 which is actuated as the locking pawl 38 moves between the locked and unlocked positions.

In operation, the retracting reel assembly 10 is normally in the stored condition illustrated in FIGS. 1 and 2 with the seat belt 32 fully wound about the cylinder 24. In this condition no current is being supplied to the heating means 56 and the locking pawl 38 is in the unlocked position in that it is latched to the leaf spring 58. The user then unwinds the seat belt 32 and after a number of convolutions of the seat belt 32 have been unwound, the switch 64 is closed to pass current through the heating means 56. As the heating means 56 is heating up the bimetallic strip 54, the user may extend the seat belt 32 to any position and move the seat belt back and forth by alternately winding and unwinding a portion of the seat belt 32 onto and off from the reel means 20. After a period of time the bimetallic strip 54 will heat sufficiently so as to move to the position shown in FIG. 3 thereby to move the leaf spring 58 to the unlatched position whereupon the locking pawl 38 moves to the locking position shown in FIG. 3. When the locking pawl 38 is in the position shown in FIG. 3 the seat belt 32 cannot be unwound any further from the reel means 20. Thus, the bimetallic latch means 52 provides a time delay to prevent the locking pawl 38 from engaging the reel means 20 before the user has adjusted the amount of unreeling or extension of the seat belt 32 from the retracting reel assembly 10. When the locking pawl 28 moves from the unlocked position of FIG. 2 to the locked position of FIG. 3 the switch 66 is opened discontinuing further current flow to the heating means 56. Thus, once the locking pawl 38 has moved to the locking position shown in FIG. 3, the bimetallic strip 54 returns to the latched position whereby the leaf spring 58 is in position to receive and latch the projection 48 of the locking pawl 38. When the tongue 33 is disconnected from the buckle, the biasing action of the spiral spring within the housing 34 will wind the seat belt 32 onto the cylinder 24. As the last few convolutions of the belt 32 are wound about the cylinder 24, the reset member 50 will be engaged by the belt to move the locking pawl 38 from the locked position shown in FIG. 3 to the unlocked position shown in FIG. 2 where the projection 48 is latched by the catch portion 60 of the leaf spring 58. Once in this position, the switches 64 and 66 are returned to the position illustrated schematically in FIG. 4.

It is to be understood that the system may be reversed wherein the heating means 56 is supplied current when in the latched position illustrated in FIG. 2 so that upon initial unreeling of the belt 32 current flow to the heating means 56 is discontinued whereby the bimetallic strip 54 will move to the left as illustrated to unlatch the catch portion 60 from the projection 48 of the latch pawl 38. Furthermore, various devices may be substituted for the reset member 50 for returning the locking pawl 38 from the locked position shown in FIG. 3 to the unlocked position shown in FIG. 2.

The embodiments of the invention in which an exclusive property or privilege is claimed are defined as follows:

1. A retracting reel assembly comprising: support means; reel means rotatably supported by said support means; an elongated flexible element connected to said reel means and adapted to be wound thereon and unwound therefrom; locking means movable between locked and unlocked positions for respectively preventing and allowing rotation of said reel means; electric circuit means for heating a bimetallic strip means which moves between latched and unlatched positions in response to different temperatures; and a catch portion movable with said bimetallic strip means for mechanically engaging said locking means when in said latched position for preventing movement of said locking means to said locked position.

2. An assembly as set forth in claim 1 wherein said latch means includes a leaf spring member with said catch portion therein, said bimetallic strip means being disposed adjacent to said leaf spring member and connected thereto.

3. An assembly as set forth in claim 1 including reset means for moving said locking means said unlocked position and into latching engagement with said catch portion as said flexible element is wound onto said reel means.

4. An assembly as set forth in claim 3 wherein said bimetallic strip means includes a bimetallic strip and heating means responsive to electrical current for heating said bimetallic strip.

5. An assembly as set forth in claim 4 including circuit for changing the current flow to said heating means as said flexible element is unwound from said reel means.

6. An assembly as set forth in claim 4 including circuit means for changing the current flow to said heating means as said flexible element is unwound from said reel means and again after said locking means is in said locked position.

7. An assembly as set forth in claim 5 wherein said reel means includes a shaft rotatably supported by said support means, a cylinder disposed concentrically about said shaft, a pair of circular ratchet members secured to the ends of said cylinder and to said shaft, said cylinder having a slot extending therealong and said flexible element being attached to said shaft and extending through said slot and first biasing means for urging said cylinder and ratchet members to rotate in a direction to wind said flexible element onto said cylinder; and said locking means includes a pawl engageable with said ratchet members in said locked position, and second biasing means urging said pawl toward said locking position.

8. An assembly as set forth in claim 7 wherein said latch means includes a leaf spring member with said catch portion therein, said bimetallic strip means being disposed adjacent to said leaf spring member and connected thereto.

9. An assembly as set forth in claim 8 wherein said circuit means includes a first switch actuated by initial unwinding and final winding of said flexible element and a second switch actuated as said pawl moves between said locked and unlocked positions.

* * * * *

PO-1050
(5/69)

UNITED STATES PATENT OFFICE
CERTIFICATE OF CORRECTION

Patent No. 3,630,465           Dated December 28, 1971

Inventor(s) JOHN S. CUCHERAN

It is certified that error appears in the above-identified patent and that said Letters Patent are hereby corrected as shown below:

IN THE SPECIFICATION

Column 1, line 29, "retrace" should be -- retract --.

Column 2, line 32, after "when" insert -- in --.

Column 3, line 24, "28" should be -- 38 --.

Column 3, line 39, "position" should be -- positions --.

IN THE CLAIMS

Column 4, line 24, after "circuit" insert -- means --.

Signed and sealed this 13th day of June 1972.

(SEAL)
Attest:

EDWARD M. FLETCHER, JR.           ROBERT GOTTSCHALK
Attesting Officer                   Commissioner of Patents